(12) United States Patent
Sarwat et al.

(10) Patent No.: US 11,626,731 B1
(45) Date of Patent: Apr. 11, 2023

(54) HYBRID RENEWABLE ENERGY SOURCE SYSTEMS

(71) Applicants: Arif I. Sarwat, Miami, FL (US); Temitayo O. Olowu, Miami, FL (US)

(72) Inventors: Arif I. Sarwat, Miami, FL (US); Temitayo O. Olowu, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/664,091

(22) Filed: May 19, 2022

(51) Int. Cl.
| | |
|---|---|
| *H02J 3/00* | (2006.01) |
| *H02J 3/32* | (2006.01) |
| *G06N 3/084* | (2023.01) |
| *H02J 3/38* | (2006.01) |
| *G06N 3/044* | (2023.01) |

(52) U.S. Cl.
CPC .............. *H02J 3/004* (2020.01); *G06N 3/044* (2023.01); *G06N 3/084* (2013.01); *H02J 3/32* (2013.01); *H02J 3/381* (2013.01); *H02J 2300/24* (2020.01)

(58) Field of Classification Search
CPC .... H02J 3/004; H02J 3/32; H02J 3/381; H02J 2300/24; G06N 3/0445; G06N 3/084
See application file for complete search history.

(56) References Cited

U.S. PATENT DOCUMENTS

| | | | |
|---|---|---|---|
| 2014/0362617 A1* | 12/2014 | Li | H02J 3/50 363/79 |
| 2016/0226253 A1* | 8/2016 | Abido | H02J 3/381 |
| 2017/0177016 A1* | 6/2017 | Chiang | G05F 1/66 |
| 2018/0284758 A1* | 10/2018 | Cella | G05B 23/0294 |
| 2020/0287410 A1* | 9/2020 | Zhao | H02J 13/00032 |
| 2020/0372349 A1* | 11/2020 | Gaitan Ospina | G06N 3/044 |
| 2022/0108262 A1* | 4/2022 | Cella | G06Q 10/063118 |
| 2022/0190597 A1* | 6/2022 | Tural | H02J 3/381 |
| 2022/0291328 A1* | 9/2022 | Ozturk | H04L 27/2647 |

* cited by examiner

*Primary Examiner* — Ziaul Karim
(74) *Attorney, Agent, or Firm* — Saliwanchik, Lloyd & Eisenschenk

(57) ABSTRACT

Hybrid renewable energy source systems and methods are provided. A hybrid renewable energy source system can include a renewable energy source system (e.g., a photovoltaic (PV) system) in conjunction with an energy storage system (ESS), such as a battery energy storage system (BESS). The hybrid renewable energy source system can include at least one intelligent decentralized controller at the inverter/converter level, feeding a robust coordinated controller, thereby allowing the hybrid renewable energy source system to operate as a unified single power generation unit (PGU).

14 Claims, 4 Drawing Sheets

HYBRID RENEWABLE ENERGY SOURCE SYSTEMS

BACKGROUND

Renewable energy plants have many internal challenges, which can be exacerbated with other modern grid changes such as high penetration renewables and low system inertia. These lead to larger frequency deviations after a generation-load mismatch event. In addition, energy derived from photovoltaic (PV) cells in particular has significant stochastic uncertainty associated with it.

BRIEF SUMMARY

Embodiments of the subject invention provide novel and advantageous hybrid renewable energy source systems and methods. A hybrid renewable energy source system can include a renewable energy source system (e.g., a photovoltaic (PV) system) in conjunction with (e.g., operable communication with) an energy storage system (ESS) (e.g., a battery energy storage system (BESS)). A hybrid PV-BESS plant can provide flexibility, stability, efficiency, and grid-forming capability. The hybrid renewable energy source system can include at least one intelligent decentralized controller at the inverter/converter level, feeding a robust coordinated controller, thereby allowing the hybrid renewable energy source system to operate as a unified single power generation unit (PGU). The hybrid renewable energy source system can be designed/configured to yield the desired outcome of rigid high-inertia power generation resources, such as conventional generators, and achieve results based on target performance.

In an embodiment, a hybrid renewable energy source system can comprise: a PV system; an ESS (e.g., a BESS) in operable communication with the PV system; a processor in operable communication with the PV system; and a (non-transitory) machine-readable medium (e.g., a (non-transitory) computer-readable medium) in operable communication with the processor and the PV system, and having instructions stored thereon that, when executed by the processor, perform the following steps: i) extracting (e.g., by the processor) weather parameters from a local weather dataset using a stacked autoencoder; and ii) executing (e.g., by the processor) a long short-term memory (LSTM) recurrent neural network model on the weather parameters to conduct forecasting of PV generation of the PV system. The hybrid renewable energy source system can cohesively operate as a single PGU. The system can further comprise: at least one inverter; at least one converter; a coordinated controller; and/or an intelligent decentralized controller at the inverter/converter level feeding the coordinated controller. The instructions when executed can further perform the step of, before executing the LSTM recurrent neural network, training (e.g., by the processor) the LSTM recurrent neural network using backpropagation through time (BPTT). The BPTT can be performed in an advanced general-purpose graphical processing unit environment integrated with a Compute Unified Device Architecture (CUDA) deep neural network (cuDNN) library. The hybrid renewable energy source system can further comprise: an inbuilt decoupled P-Q control; a virtual-inertia control; a BESS control; grid-forming capability during transient and steady state; voltage-frequency stabilization; dynamic transient stability under disturbances; and/or black-start capability.

In another embodiment, a method for increasing efficiency of a PV system can comprise: connecting an ESS (e.g., a BESS) in operable communication with the PV system; extracting (e.g., by a processor in operable communication with the PV system) weather parameters from a local weather dataset using a stacked autoencoder; and executing (e.g., by the processor) a LSTM recurrent neural network model on the weather parameters to conduct forecasting of PV generation of the PV system. The PV system and the ESS (and the processor) can form a hybrid renewable energy source system that cohesively operates as a single PGU. The method can further comprise: providing at least one inverter in operable communication with the PV system; providing at least one converter in operable communication with the PV system; providing a coordinated controller in operable communication with the PV system; and/or providing an intelligent decentralized controller at the inverter/converter level in operable communication with the PV system and feeding the coordinated controller. The method can further comprise, before executing the LSTM recurrent neural network, training (e.g., by the processor) the LSTM recurrent neural network using BPTT. The BPTT can be performed in an advanced general-purpose graphical processing unit environment integrated with a cuDNN library. The method can further comprise providing the hybrid renewable energy source system with: an inbuilt decoupled P-Q control; a virtual-inertia control; a BESS control; grid-forming capability during transient and steady state; voltage-frequency stabilization; dynamic transient stability under disturbances; and/or black-start capability.

DETAILED DESCRIPTION

Embodiments of the subject invention provide novel and advantageous hybrid renewable energy source systems and methods. A hybrid renewable energy source system can be referred to herein as a resilient efficient renewable energy-shed optimizer (RERESO), and it can include a renewable energy source system (e.g., a photovoltaic (PV) system) in conjunction with (e.g., operable communication with) an energy storage system (ESS) (e.g., a battery energy storage system (BESS)). A hybrid PV-BESS plant can provide flexibility, stability, efficiency, and grid-forming capability. The hybrid renewable energy source system can include at least one intelligent decentralized controller at the inverter/converter level, feeding a robust coordinated controller, thereby allowing the hybrid renewable energy source system to operate as a unified single power generation unit (PGU). The hybrid renewable energy source system can be designed/configured to yield the desired outcome of rigid high-inertia power generation resources, such as conventional generators, and achieve results based on target performance.

Hybrid renewable energy source systems and methods of embodiments of the subject invention provide improvement in the coordination and control of a PV-rich smart grid. In order to mitigate the stochastic uncertainty associated with PV energy, ESSs that yield enhanced system stiffness are required. Such advanced features are achieved using an interplay of standalone and coordinated controls. The RERESO architecture addresses these challenges by providing grid-forming and other enhanced grid services with a coordinated controller. The coordinated controller can support the co-located and connected RERESO at a single point of common coupling (PCC) within the bulk grid. The RERESO can also provide flexibility for dynamic changes of resources and response during normal and abnormal conditions, as well as grid-forming controls for plants with multiple inverter-based resources (IBR).

Figure 1:
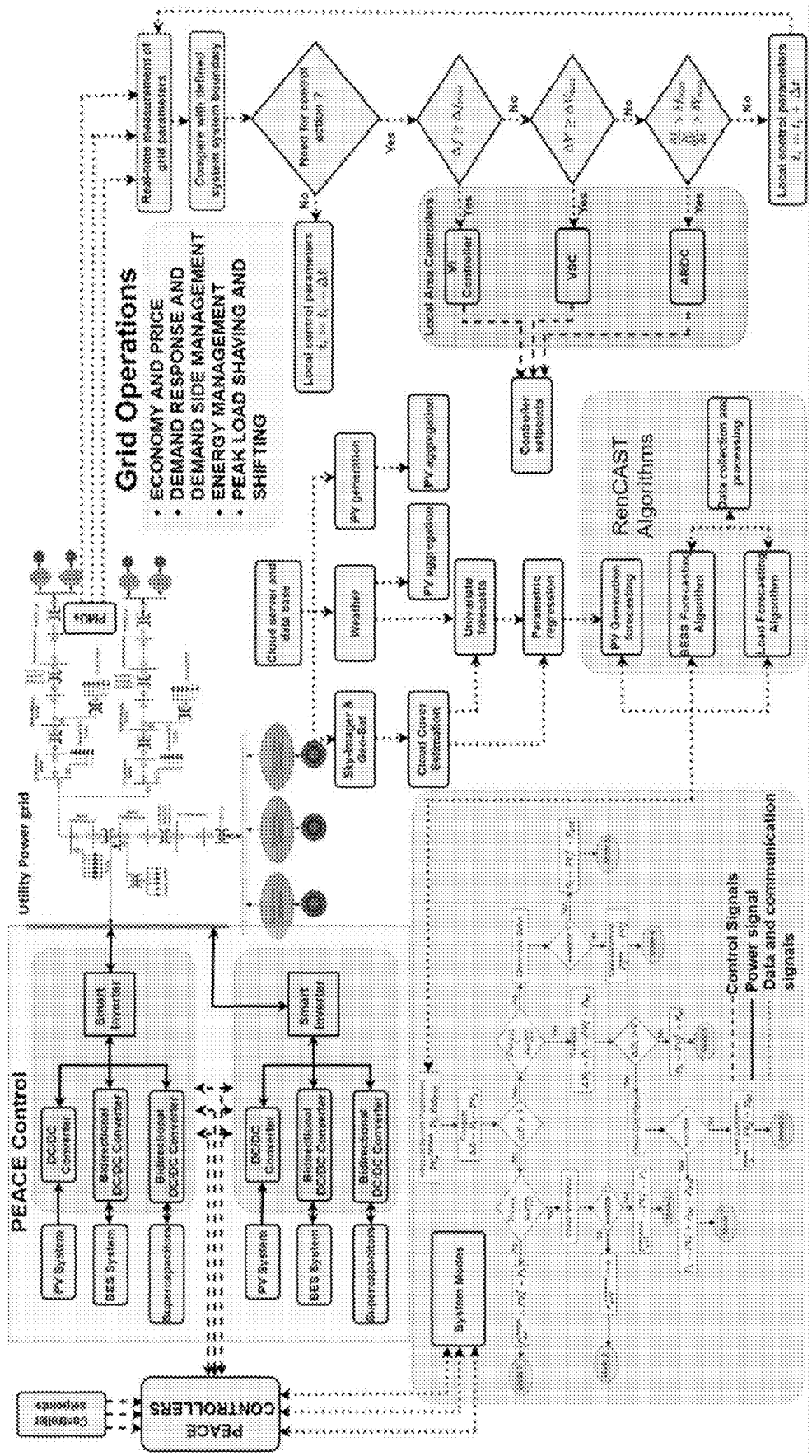
FIG. 1 shows a schematic view of the architecture of a hybrid renewable energy source system, according to an embodiment of the subject invention.

FIG. 1 shows a schematic view of the architecture of a hybrid renewable energy source system, according to an embedment of the subject invention. Referring to FIG. 1, the RERESO can include heterogeneous resources (e.g., one or more renewable energy sources (e.g., PVs), one or more BESSs, one or more other ESSs, one or more inverters, and/or one or more converters) and can cohesively operate as a single PGU, meeting all appropriate industry standards. This is possible due to rugged, reliable, and efficient control and coordination of grid following and forming inverters and the BESS having its own ramp rate and timing challenges.

An accurate forecasting model is required to determine the expected PV generation within a PV system on an hourly basis and a daily basis. In order to achieve this, embodiments can utilize one or more deep learning algorithms for effective forecasting based on temporal weather characteristics. A stacked autoencoder can first be formulated to extract the most informative weather parameters from a local weather dataset. Based on the extracted weather parameters, a long short-term memory (LSTM) recurrent neural network model can then be used to conduct, at the local level, short-term (hour-ahead and day-ahead) forecasting of PV generation using historical time-series data of different dependent variables. The LSTM can be trained using backpropagation through time (BPTT) in an advanced general-purpose graphical processing unit environment integrated with a Compute Unified Device Architecture (CUDA) deep neural network (cuDNN) library for accelerating the performance and/or a Keras application programming interface (API) (e.g., deployed over a framework, such as a TensorFlow framework).

In many embodiments, the RERESO can include an inbuilt decoupled P-Q control, a virtual-inertia control, a BESS control, grid-forming capability during transient and steady state, voltage-frequency stabilization, dynamic transient stability under disturbances, and/or black-start capability. The RERESO can be implemented on a local power utility system to address stability and transients along with the faults inside the hybrid plants. The controllers in the RERESO can be designed/configured using, for example: a) dynamic model-based control and stability for the RERESO under fault and transient conditions; b) model predictive control (MPC) for optimal performance in the presence of inherent nonlinearities and state and control constraints; c) disturbance estimation and rejection; d) decentralized control of individual resources; and/or e) novel active disturbance rejection control (ADRC) schemes for ground fault interrupters (GFIs) to track voltage/frequency references and improve system stability.

The RERESO can have a comprehensive coordination control framework that makes the individual resources of the RERESO holistically operate as a single unit. The RERESO can therefore address the following issues: 1) timing and delays; 2) inverter characteristics and grid following and forming; 3) multiple inverters with different layouts; 4) network control and communication; 5) system level coordination; and/or 6) meeting utility standards. The inventors were able to develop the hybrid renewable energy source systems and methods of embodiments of the subject invention due to extensive experimentation using state of art (SOA) facilities and expansive data of the power grid, PVs, and storage elements.

Embodiments of the subject invention provide a focused technical solution to the focused technical problem of how to increase the efficiency of renewable energy systems. Embodiments of the subject invention improve the renewable energy system itself by increasing its resiliency and its efficiency.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 3:
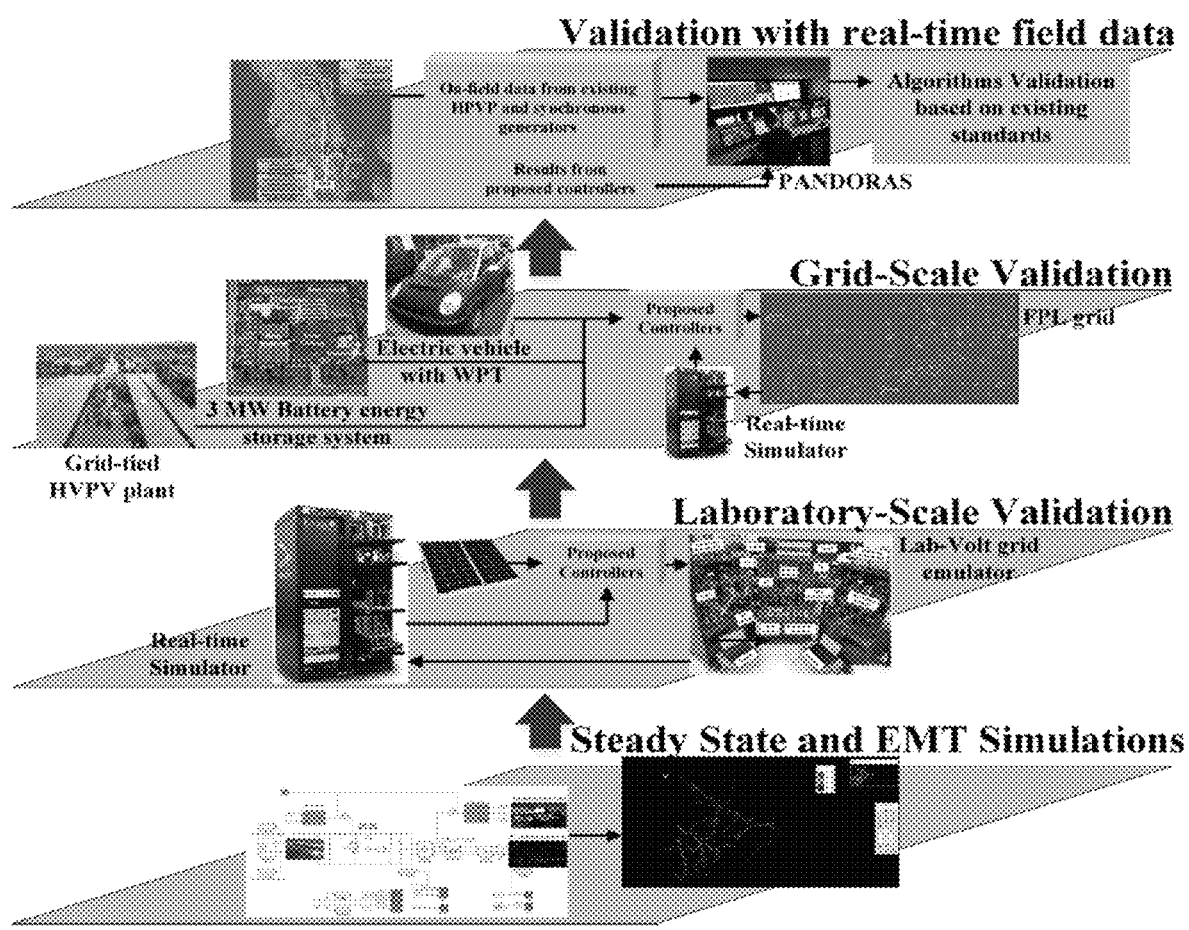
FIG. 3 shows a schematic view of a process for testing and validation of a hybrid renewable energy source system, according to an embodiment of the subject invention

The response of the RERESO as described herein was examined and quantified by comparing it to similarly sized conventional generators. Its performance was evaluated for load following, ramping, ability to track automatic generation control (AGC) signals, and primary and secondary frequency response. The testing and validation of the RERESO design and control involved using a real-time integrated energy management systems (EMS). The utility-scale PV systems integrated allow the developed local controllers to be comprehensively validated during simulation with various scenarios (outlined in industry standards) in the grid. Using existing performance indices, the developed local RERESO controller can be evaluated. The layers of validation of the RERESO are as shown in FIG. 3.

The basic local controller functionalities are described in Anzalchi (Advanced solutions for renewable energy integration into the grid addressing intermittencies, harmonics and inertial response, 2017; which is hereby incorporated by reference herein in its entirety) and was validated for its application in the local control loop of the RERESO. The local controller incorporated decoupled P-Q (on-demand dispatch) control, virtual inertia controller, and hybrid energy storage system (HESS) control was field-tested to achieve the on-demand dispatch capability. In another phase, the RERESO was integrated to the system to validate the performance of the local area controller functions with other RERESO units. The power-hardware-in-the-loop test was carried out using the RTS testbed integrated with the Institute of Electrical and Electronics Engineers (IEEE) testbed at Florida International University in Miami, Fla.

Example 2

Figure 2A:
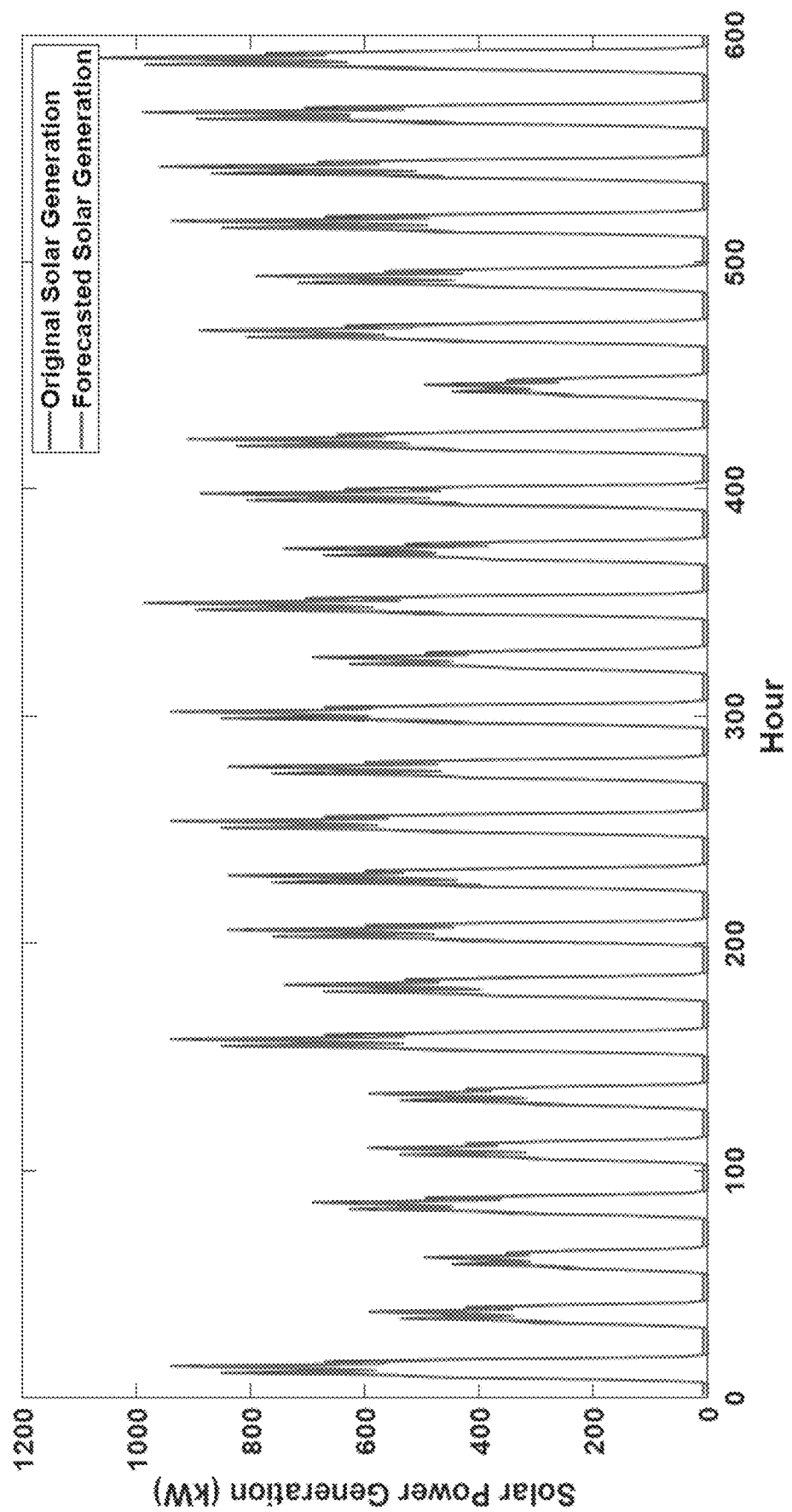
FIG. 2(a) shows a plot of solar power generation (in kilowatts (kW)) versus time (in hours), showing a comparison between actual solar generation and forecasted solar generation, on an hourly basis. The (blue) curve with the higher value at 350 hours is for the actual solar generation, and the (red) curve with the lower value at 350 hours is for the forecasted solar generation.
Figure 2B:
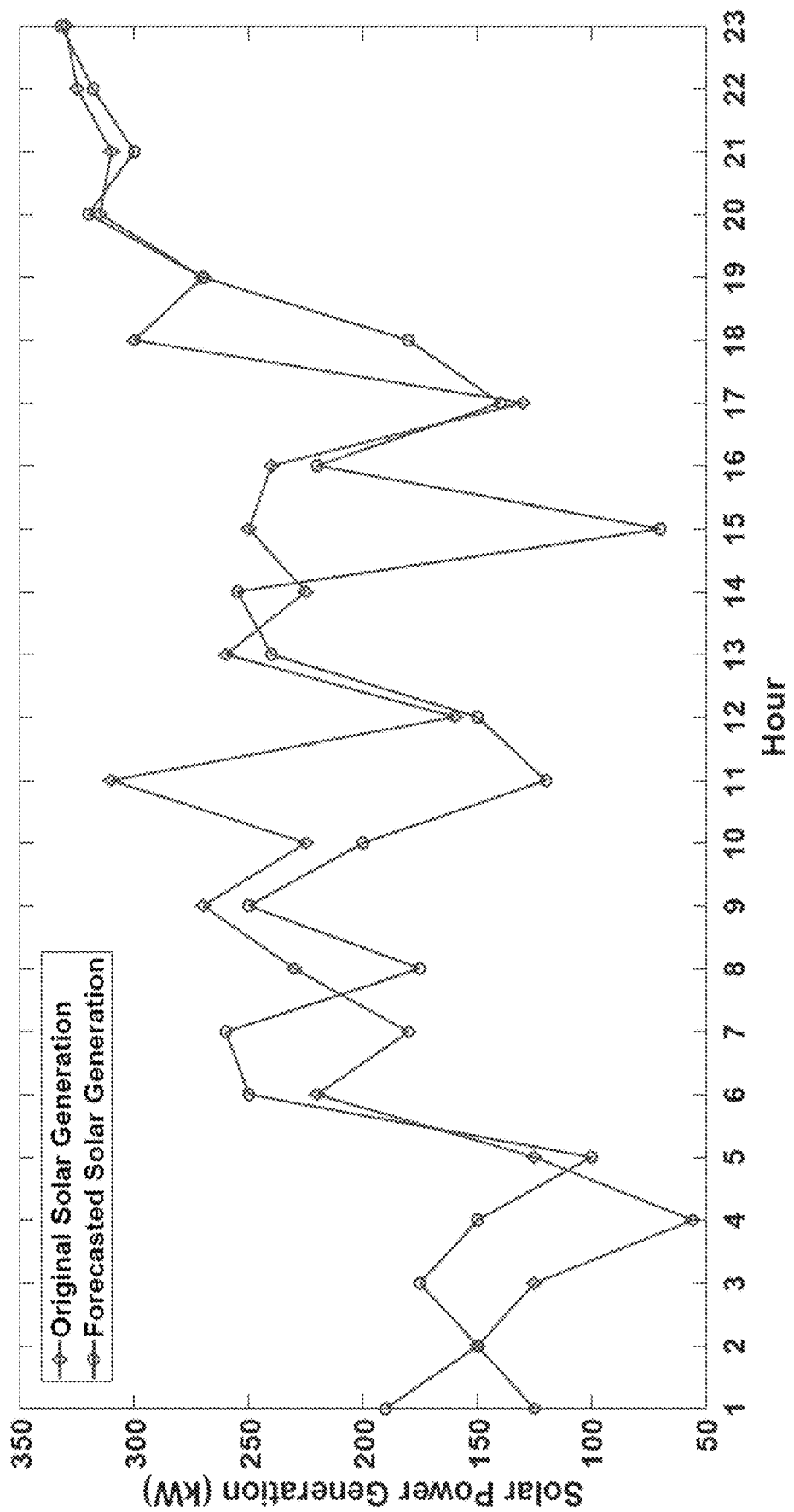
FIG. 2(b) shows a plot of solar power generation (in kW) versus time (in days), showing a comparison between actual solar generation and forecasted solar generation, on a daily basis. The (blue) curve with the higher value at 11 days is for the actual solar generation, and the (red) curve with the lower value at 11 days is for the forecasted solar generation.

The performance of the forecasting framework of the RERESO was tested on the solar power data of the PV system installed at Florida International University in Miami, Fla. FIGS. 2(a) and 2(b) compare the power data forecast with the actual solar generation on an hourly basis and a daily basis, respectively, for the first 25 days of June 2017. The hourly and daily forecast results are compared with the actual data for the first 600 hours as shown in FIGS. 2(a) and 2(b). The mean absolute percent error for the day-ahead forecasting was 19.5%, and the mean absolute percent error for the hour-ahead forecasting was 21.95%.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A hybrid renewable energy source system, comprising:
a photovoltaic (PV) system;
a battery energy storage system (BESS) in operable communication with the PV system;
a processor in operable communication with the PV system;
an inbuilt decoupled P-Q control;
a virtual-inertia control;
a BESS control;
grid-forming capability during transient and steady state;
voltage-frequency stabilization;
dynamic transient stability under disturbances;
black-start capability; and
a machine-readable medium in operable communication with the processor and the PV system, and having instructions stored thereon that, when executed by the processor, perform the following steps:
i) extracting, by the processor, weather parameters from a local weather dataset using a stacked autoencoder; and
ii) executing, by the processor, a long short-term memory (LSTM) recurrent neural network model on the weather parameters to conduct forecasting of PV generation of the PV system,
the hybrid renewable energy source system cohesively operating as a single power generation unit (PGU).

2. The hybrid renewable energy source system according to claim 1, further comprising at least one inverter.

3. The hybrid renewable energy source system according to claim 1, further comprising at least one converter.

4. The hybrid renewable energy source system according to claim 1, further comprising:
at least one inverter;
at least one converter;
a coordinated controller; and
an intelligent decentralized controller at the inverter/converter level feeding the coordinated controller.

5. The hybrid renewable energy source system according to claim 1, the instructions when executed further performing the following step:
before executing the LSTM recurrent neural network, training the LSTM recurrent neural network using backpropagation through time (BPTT).

6. The hybrid renewable energy source system according to claim 1, the BPTT being performed in an advanced general-purpose graphical processing unit environment integrated with a Compute Unified Device Architecture (CUDA) deep neural network (cuDNN) library.

7. A method for increasing efficiency of a photovoltaic (PV) system, the method comprising:
connecting a battery energy storage system (BESS) in operable communication with the PV system;

extracting, by a processor in operable communication with the PV system, weather parameters from a local weather dataset using a stacked autoencoder; and executing, by the processor, a long short-term memory (LSTM) recurrent neural network model on the weather parameters to conduct forecasting of PV generation of the PV system, the PV system, the ESS, and the processor forming a hybrid renewable energy source system that cohesively operates as a single power generation unit (PGU), and the method further comprising providing the hybrid renewable energy source system with:
- an inbuilt decoupled P-Q control;
- a virtual-inertia control;
- a BESS control;
- grid-forming capability during transient and steady state;
- voltage-frequency stabilization;
- dynamic transient stability under disturbances; and
- black-start capability.

8. The method according to claim 7, further comprising providing at least one inverter in operable communication with the PV system.

9. The method according to claim 7, further comprising providing at least one converter in operable communication with the PV system.

10. The method according to claim 7, further comprising:
providing at least one inverter in operable communication with the PV system;
providing at least one converter in operable communication with the PV system;
providing a coordinated controller in operable communication with the PV system; and
providing an intelligent decentralized controller at the inverter/converter level in operable communication with the PV system and feeding the coordinated controller.

11. The method according to claim 7, further comprising, before executing the LSTM recurrent neural network, training the LSTM recurrent neural network using backpropagation through time (BPTT).

12. The method according to claim 7, the BPTT being performed in an advanced general-purpose graphical processing unit environment integrated with a Compute Unified Device Architecture (CUDA) deep neural network (cuDNN) library.

13. The method according to claim 7, the inbuilt decoupled P-Q control being in operable communication with the PV system.

14. A hybrid renewable energy source system, comprising:
- a photovoltaic (PV) system;
- a battery energy storage system (BESS) in operable communication with the PV system;
- at least one inverter;
- at least one converter;
- a coordinated controller;
- an intelligent decentralized controller at the inverter/converter level feeding the coordinated controller;
- an inbuilt decoupled P-Q control;
- a virtual-inertia control;
- a BESS control;
- grid-forming capability during transient and steady state;
- voltage-frequency stabilization;
- dynamic transient stability under disturbances;
- black-start capability;
- a processor in operable communication with the PV system; and
- a machine-readable medium in operable communication with the processor and the PV system, and having instructions stored thereon that, when executed by the processor, perform the following steps:
  i) extracting, by the processor, weather parameters from a local weather dataset using a stacked autoencoder;
  ii) training, by the processor, a long short-term memory (LSTM) recurrent neural network model using backpropagation through time (BPTT); and
  iii) executing, by the processor, the LSTM recurrent neural network model on the weather parameters to conduct forecasting of PV generation of the PV system, the hybrid renewable energy source system cohesively operating as a single power generation unit (PGU), and the BPTT being performed in an advanced general-purpose graphical processing unit environment integrated with a Compute Unified Device Architecture (CUDA) deep neural network (cuDNN) library.

* * * * *